US006865795B2

(12) United States Patent
Hernandez et al.

(10) Patent No.: US 6,865,795 B2
(45) Date of Patent: Mar. 15, 2005

(54) METHOD OF INSTALLING A VEHICLE ROOF ASSEMBLY

(75) Inventors: Olimpia Maria Hernandez, Birmingham, MI (US); James R. Spaulding, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 104 days.

(21) Appl. No.: 10/126,767

(22) Filed: Apr. 19, 2002

(65) Prior Publication Data

US 2003/0196309 A1 Oct. 23, 2003

(51) Int. Cl.[7] .............................. B23P 21/00; B60J 7/11
(52) U.S. Cl. ...................... 29/469; 296/214; 296/218; 296/210
(58) Field of Search ................ 29/897.2, 469, 29/771, 783, 786, 759, 464; 296/214, 215, 218, 210, 97.5

(56) References Cited

U.S. PATENT DOCUMENTS

| | | | | | |
|---|---|---|---|---|---|
| 4,453,303 A | * | 6/1984 | Leddet | ................. | 29/407.05 |
| 4,553,309 A | * | 11/1985 | Hess et al. | ................. | 29/450 |
| 4,728,383 A | * | 3/1988 | Kaller et al. | ................. | 156/285 |
| 4,902,068 A | * | 2/1990 | Dowd et al. | ................. | 296/214 |
| 5,018,781 A | * | 5/1991 | Kumasaka et al. | ......... | 296/210 |
| 5,203,814 A | * | 4/1993 | Kushizaki et al. | ......... | 29/897.2 |
| 5,269,060 A | * | 12/1993 | Dowd et al. | ............... | 29/897.2 |
| 5,353,495 A | * | 10/1994 | Terabayashi et al. | ......... | 29/714 |
| 5,540,478 A | | 7/1996 | Schuch | ................. | 296/210 |
| 5,688,022 A | | 11/1997 | Adams et al. | ............... | 296/214 |
| 5,795,014 A | | 8/1998 | Balgaard | ................. | 276/210 |
| 5,795,015 A | * | 8/1998 | Corpe et al. | ................. | 296/214 |
| 6,070,902 A | * | 6/2000 | Kowalski et al. | ......... | 280/730.2 |
| 6,073,961 A | * | 6/2000 | Bailey et al. | ............ | 280/730.2 |
| 6,102,435 A | | 8/2000 | Wallner et al. | ......... | 280/730.2 |
| 6,338,517 B1 | | 1/2002 | Canni et al. | ............... | 296/37.8 |
| 6,340,204 B1 | * | 1/2002 | Seifert | .................. | 296/216.07 |
| 6,367,872 B1 | * | 4/2002 | Bohm et al. | ............... | 296/214 |
| 6,470,559 B1 | * | 10/2002 | Spaulding et al. | ......... | 29/469.5 |
| 6,493,915 B2 | * | 12/2002 | Zonneveld et al. | ......... | 29/401.1 |
| 2001/0015003 A1 | * | 8/2001 | Kurtz | ................. | 29/430 |

FOREIGN PATENT DOCUMENTS

EP WO 98/39170 * 9/1998

* cited by examiner

Primary Examiner—Marc Jimenez
(74) Attorney, Agent, or Firm—Laura C. Hargitt

(57) ABSTRACT

A method of assembling a roof assembly into a vehicle includes assembling the roof assembly and at least one module subassembly. The roof assembly includes a roof outer panel configured to cover a roof opening in the vehicle. The roof assembly and the module subassemblies are installed by operators working entirely outside the vehicle, resulting in increased efficiency and production cost savings.

19 Claims, 6 Drawing Sheets

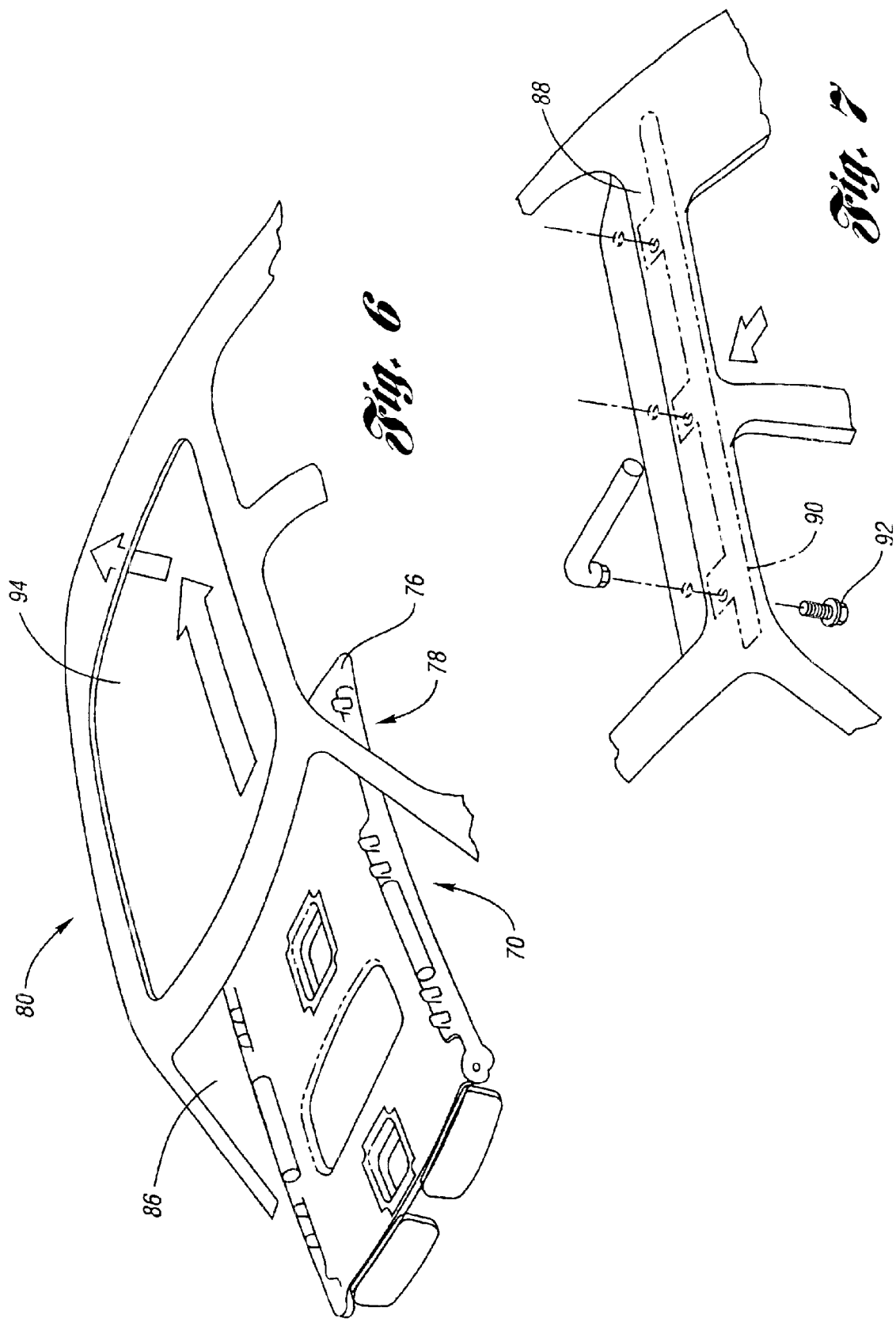

METHOD OF INSTALLING A VEHICLE ROOF ASSEMBLY

BACKGROUND OF THE INVENTION

1. Field of the Invention

The present invention relates to a vehicle roof assembly and method of assembling and installing the vehicle roof assembly into a vehicle.

2. Background Art

The use of headliners to cover the interior of a vehicle roof is well known. The headliner conceals the interior structural features of the roof and presents an aesthetically pleasing appearance to the vehicle occupants. The headliner also at least partially covers a variety of components that are often assembled into the headliner itself. Such components may include sunroof assemblies, roof antennas, overhead consoles, infotainment systems, roof rail air bags, and a variety of other consoles or electronic devices.

Installation of headliners, which are large and relatively rigid structures, is made more difficult by the often heavy components that are installed in the headliner prior to the headliner's installation into the vehicle. The difficulty of installing a headliner is in part due to the need for an installer to work overhead from inside the vehicle. This is particularly true when the vehicle roof is attached prior to the installation of the headliner, necessitating the installation of the headliner through an open windshield or rear window. Even when an outer roof panel is installed after the headliner, overhead installation of the headliner may still be required.

Accordingly, it is desirable to provide a method of assembling and installing a roof assembly into a vehicle that eliminates the need for an operator to work overhead when installing the headliner or any portion of the roof assembly.

SUMMARY OF THE INVENTION

One aspect of the present invention provides a method of assembling and installing a roof assembly into a vehicle that does not require an operator to work overhead.

Another aspect of the invention provides a method of assembling and installing a roof assembly into a vehicle where several components of the assembly are loaded in the same station, thereby reducing the total number of assembly stations required in the general assembly facility and resulting in a labor cost savings.

Yet another aspect of the invention provides for increasing available space in a body shop by eliminating vehicle roof handling and welding of the vehicle roof to the vehicle in the body shop.

Another aspect of the invention increases vehicle assembly efficiency by moving the roof installation to the general assembly facility where vehicle components are sequenced.

A further aspect of the invention provides for increased flexibility by moving the roof assembly to the general assembly facility where the greater available floor space allows more installation options.

Accordingly, a method for assembly of a vehicle roof assembly into a vehicle is provided which comprises providing a structure defining a roof opening in the vehicle, providing a first inventory of components suitable for use inside the vehicle, and providing an inventory of panels suitable for closing the roof opening of the vehicle. At least one of the components from the first inventory of components is assembled with a panel from the inventory of panels to form a roof assembly. The roof assembly is attached to the structure defining the roof opening from outside the vehicle.

Another aspect of the invention provides a method for assembly of a vehicle roof assembly into a vehicle that comprises providing a structure defining a roof opening in the vehicle, providing a first inventory of components suitable for use inside the vehicle, and providing an inventory of panels suitable for closing the roof opening of the vehicle. At least one of the components from the first inventory of components is assembled with a panel from the inventory of panels and a headliner that has first and second free edges. The at least one component, the panel, and the headliner form a roof assembly. The first and second free edges of the headliner are restrained with a restraining device, and the roof assembly is installed into the vehicle by placing the headliner through the roof opening. The restraining device is then removed, and the first and second free edges of the headliner are attached to the vehicle, thereby concealing a portion of the structure defining the roof opening.

Yet another aspect of the invention provides a method for assembly of a vehicle roof assembly into a vehicle that comprises providing a structure defining a roof opening in the vehicle, providing a first inventory of components suitable for use inside the vehicle, and providing an inventory of panels suitable for closing the roof opening of the vehicle. At least one component is chosen from the first inventory of components, and a panel is chosen from the inventory of panels. The at least one component that is chosen from the first inventory of components is attached to the roof outer panel that is chosen from the inventory of panels to form a roof assembly. The roof assembly is then attached to the structure defining the roof opening from outside the vehicle.

Another aspect of the invention provides a vehicle roof assembly adapted for attachment to a structure defining a roof opening in a vehicle. The vehicle roof assembly comprises a panel having an edge for closing the roof opening of the vehicle on one side of the roof opening; the panel is selectable from an inventory of panels. Included in the vehicle roof assembly is at least one component chosen from an inventory of components. The at least one component is connected to the selected panel to form a roof subassembly. Also included is a headliner that is connectable in one manner to the roof subassembly, and in another manner to the other side of the roof opening.

The above object and other objects, features, and advantages of the present invention are readily apparent from the following detailed description of the best modes for carrying out the invention when taken in connection with the accompanying drawings.

BRIEF DESCRIPTION OF THE DRAWINGS

FIG. 6 is a fragmentary perspective view illustrating the placement of a headliner module subassembly through a windshield opening in the vehicle;

FIG. 7 is a fragmentary perspective view illustrating the attachment of a portion of the headliner module subassembly to a side roof rail of the vehicle.

DETAILED DESCRIPTION OF THE PREFERRED EMBODIMENTS

Figure 1:
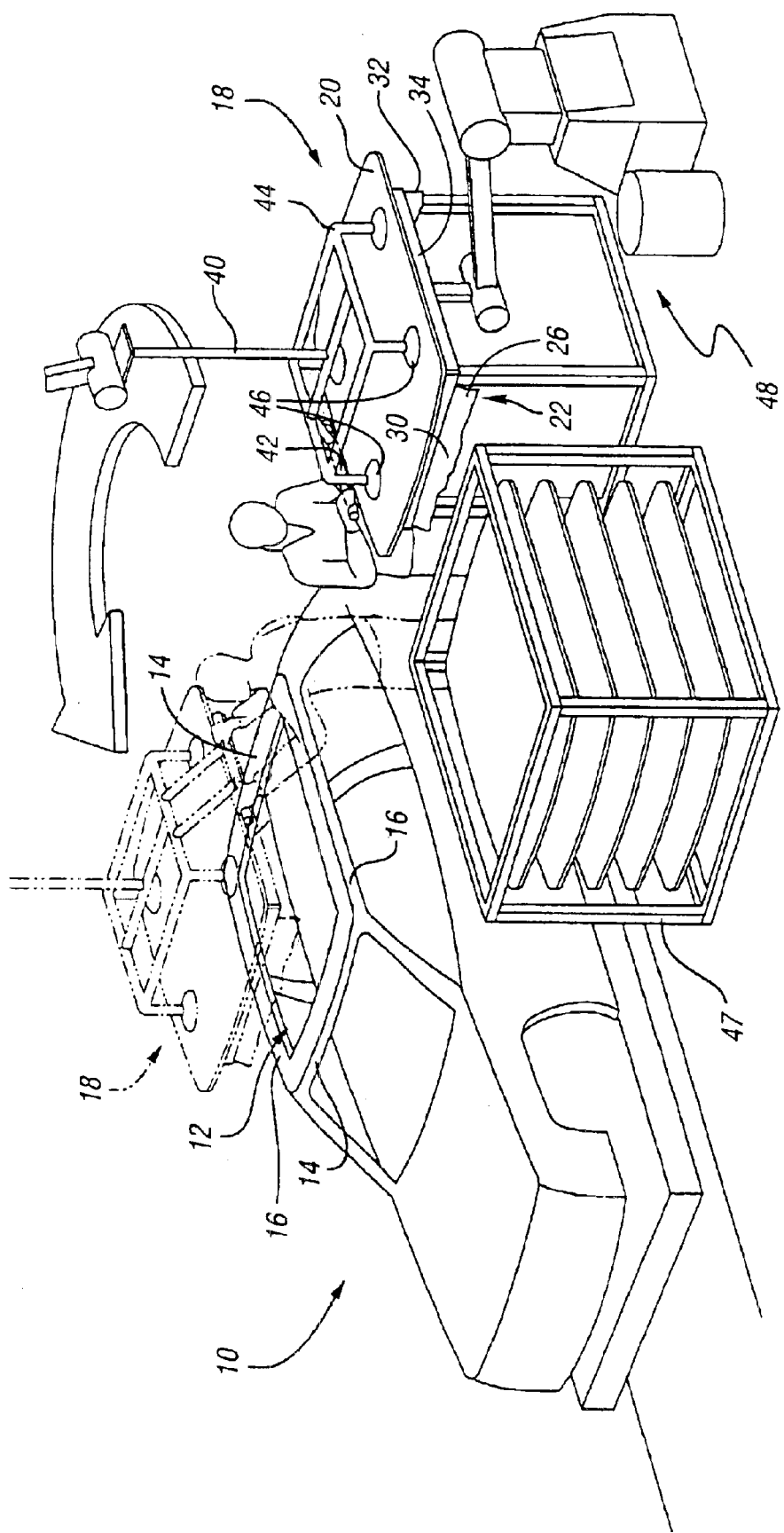
FIG. 1 is a perspective view illustrating a method of assembling a roof assembly into a vehicle.

One embodiment of the present invention is shown in FIGS. 1–4. A vehicle 10 has a roof opening 12 defined by headers 14 and side rails 16. A roof assembly 18 includes a roof outer panel 20 and a plurality of components 22. The roof outer panel 20 is chosen from an inventory of panels, and can be made from any of a variety of materials, including, but not limited to, metals, plastics, and composites. The components 22 are chosen from a first inventory of components which may include headliners, sunroof assemblies, roof antennas, infotainment systems, air ducts, switches, lights, wires and harnesses, consoles, audio components, navigation systems, display systems, compasses, thermometers, mirrors or combinations thereof. In this embodiment, the roof assembly 18 includes a plurality of electronic components 24 (electrical connectors shown in FIG. 2), and a headliner 26.

The components 22, including the headliner 26 and the electronic components 24, are typically assembled prior to being shipped to the vehicle assembly plant. It is contemplated however, that all of the component assembly may occur at the vehicle assembly plant sometime prior to the roof assembly 18 being installed in the vehicle 10. The headliner 26 is secured to the roof outer panel 20 by an adhesive that is applied in such a way so as to leave a portion of the headliner unattached to the roof outer panel 20. The headliner 26 may be secured to the roof outer panel 20 offsite, such as at a supplier's facility, or it may be integrated into the assembly operations at the vehicle assembly plant.

The unattached portion of the headliner 26 includes first and second free edges 30, 32 which are displaceable relative to the roof outer panel 20. The first and second free edges 30, 32 are located in a position corresponding to the headers 14. The sides of the headliner 26 that correspond to the side rails 16 are configured so they do not overlap the side rails 16 when the roof assembly 18 is installed in the vehicle 10. As explained below, separate side module subassemblies are attached after the roof assembly 18 is installed in the vehicle 10.

Figure 3:
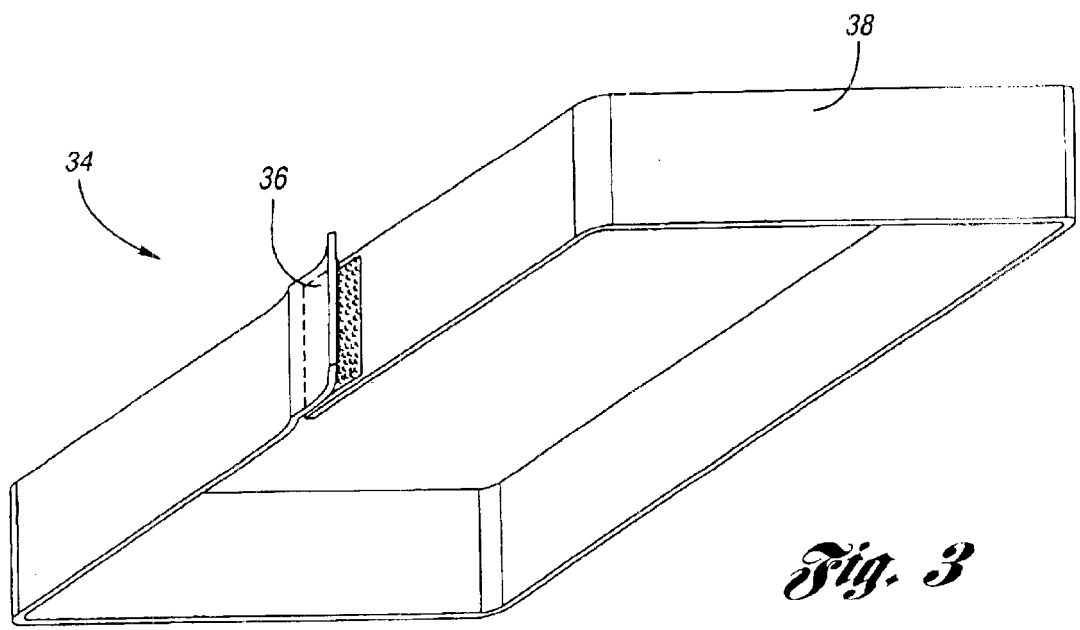
FIG. 3 is a perspective view of a restraining device.

A restraining device 34, one example of which is shown in FIG. 3, is placed around the headliner 26, including the first and second free edges 30, 32, to facilitate installation of the roof assembly 18 into the vehicle 10. The restraining device 34 can be installed around the headliner 26 before or after the headliner 26 is attached to the roof outer panel 20. The restraining device 34 includes a hook and loop fastening device 36, and a rigid frame 38. The rigid frame 38 is sized to fit into the roof opening 12 without interfering with the headers 14 or the side rails 16. The hook and loop fastening device 36 represents one of many possible configurations for the restraining device 34. Others include using different types of fastening devices, or making the restraining device adjustable so as to obviate the need for any fastening device.

Figure 2:
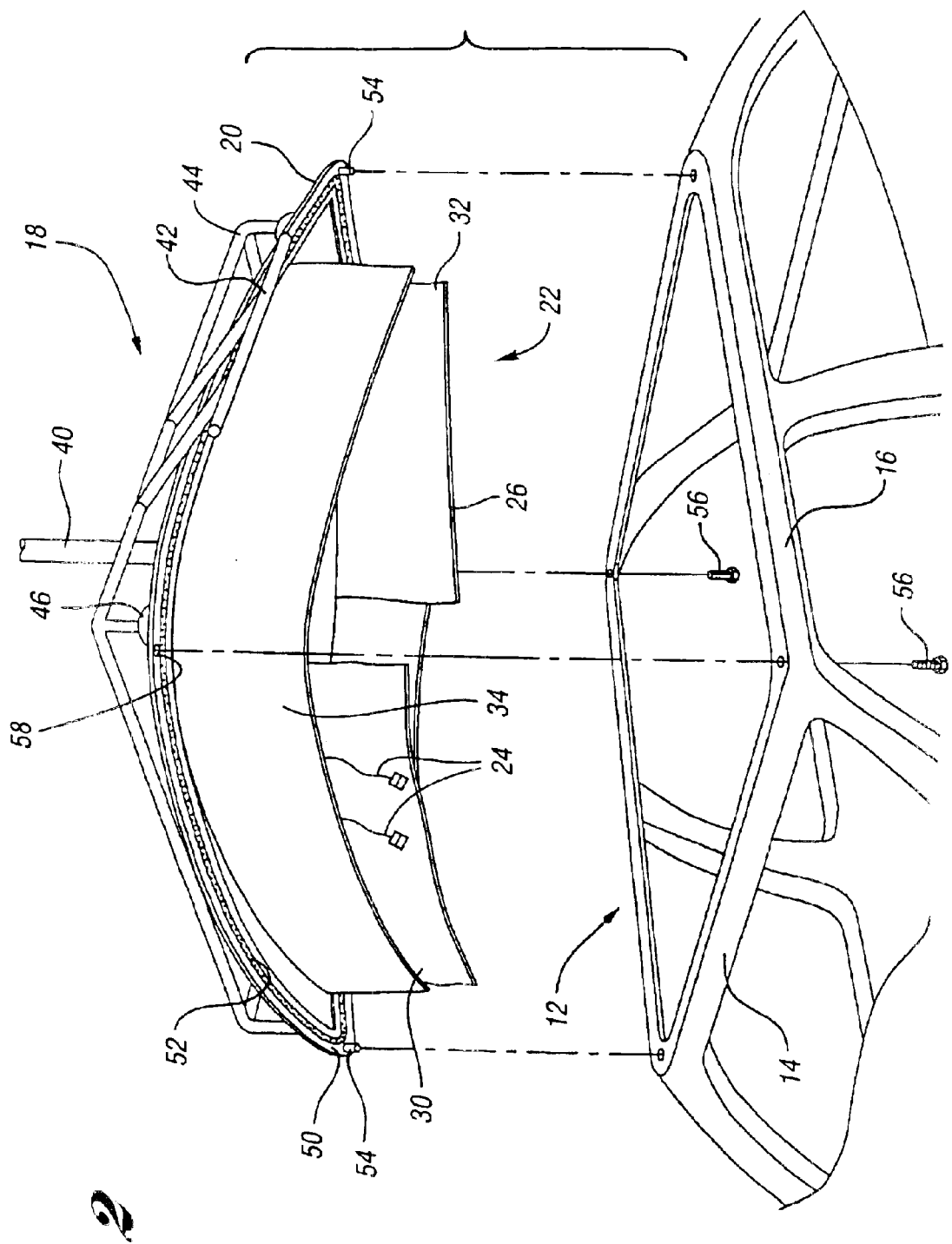
FIG. 2 is a fragmentary perspective view of a portion of a vehicle and a roof assembly ready for installation into the vehicle.

Installation of the roof assembly 18 into the vehicle 10 is shown in FIGS. 1 and 2. The roof assembly 18 is moved to the vehicle 10, where it is shown in phantom, with a movable transport arm 40, that helps to guide and position the roof assembly 18. An operator controls the transport arm 40 by using guide handles 42, which are attached to a transport frame 44. The transport frame 44 has suction cups 46 which selectively grip and release a surface of the roof outer panel 20. The transport frame 44 initially moves the roof assembly 18 from a storage rack 47 to an adhesive station 48. At the adhesive station 48, an underside 50 of the roof outer panel 20 is accessible to an operator. This allows the operator to apply an adhesive 52, such as a pumpable urethane, to the underside 50 of the roof outer panel 20.

After the roof assembly 18 is positioned over the roof opening 12, it is then seated on the headers 14 and side rails 16 with the help of guide pin locators 54. Once the roof assembly 18 is seated, it is secured to the vehicle 10 with the previously applied adhesive 52 and fasteners 56 that are secured to mounting holes 58, only one of which is seen in FIG. 2. The next step is to remove the restraining device 34, thereby allowing the first and second free edges 30, 32 to spring back to their unrestrained configuration. The first and second free edges are then positioned to cover a portion of the headers 14 inside the vehicle, with further securing of the first and second free edges being performed as required.

Figure 4:
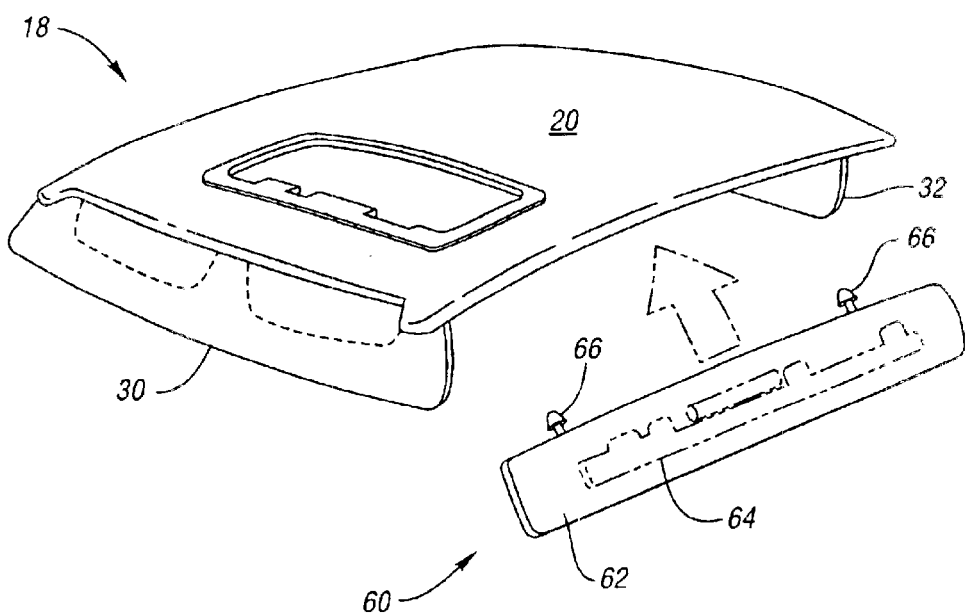
FIG. 4 is a perspective view illustrating the installation of side module subassemblies.

As explained above, the headliner 26 is configured not to overlap the side rails 16. One of the reasons for this is to facilitate easier installation of side roof rail air bags into the vehicle 10. FIG. 4 illustrates the final steps of the roof assembly installation, which includes attachment of side module subassemblies 60. After the roof assembly 18 is secured to the vehicle 10, which was removed from this view for clarity, the side module subassemblies 60 are attached to the vehicle. FIG. 4 shows only a driver's side module subassembly, though its mirror image is attached on the passenger's side of the vehicle.

The side module subassemblies 60 include a side trim component 62, and a side roof rail air bag assembly 64, shown in phantom. Once the roof assembly 18 is secured to the vehicle 10, it is a simple matter for an operator to place the side module subassemblies 60 through an open window and attach them to the vehicle. In this embodiment, rosebud clips 66 are attached to the side trim component 62, and allow for an easy snap fit into the vehicle. In addition to the side trim component 62 and the side roof rail air bag assembly 64, a variety of other components (not shown) can be assembled into the side module subassemblies. These components are chosen from a second inventory of components and may include assist handles, assist straps, hooks, hangers or combinations thereof.

Another embodiment of the present invention is shown in FIGS. 5–8. Unlike the previous embodiment where the headliner and some associated components were made part of the roof assembly, this embodiment includes a roof assembly 68 (see FIG. 8) separate from a headliner module subassembly 70. The roof assembly 68 includes a roof outer panel 72 and components 74 chosen from a first inventory of components. In this embodiment, the first inventory of components does not include headliners, but will typically include sunroof assemblies, roof antennas, infotainment systems, consoles or combinations thereof. It is contemplated that the heaviest vehicle interior components will be included in the roof assembly 68.

Figure 5:
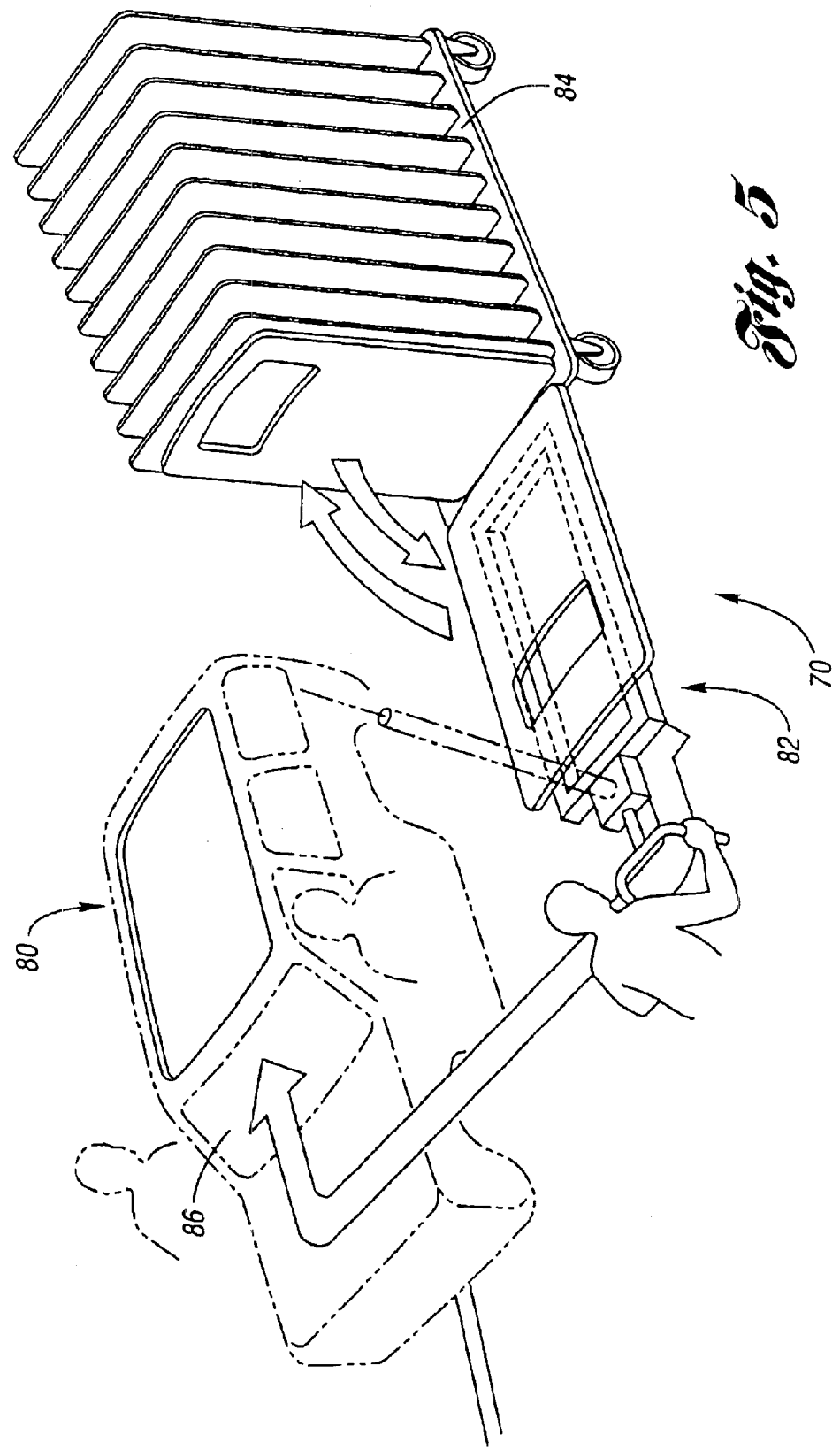
FIG. 5 is a perspective view illustrating the installation of headliner module subassemblies into a vehicle in accordance with an another embodiment of the invention.

The headliner module subassembly 70 is assembled from a headliner 76 and components 78, chosen from a third inventory of components, see FIG. 5. Typically the components 78 will include side roof rail air bags, but may also include air ducts, switches, lights, wires and harnesses, audio components, navigation systems, display systems, compasses, thermometers, mirrors or combinations thereof. The headliner module subassembly 70 will often be assembled at a supplier's facility and shipped complete to the vehicle assembly plant; however, headliner module subassemblies can be assembled at the vehicle assembly plant, prior to their installation into the vehicle.

FIG. 5 shows headliner module subassemblies 70 being loaded into a vehicle 80, shown in phantom. An operator uses a transport device 82 to move the headliner module subassemblies 70 from a storage rack 84 to the vehicle 80, where they are moved through a windshield opening 86. In some vehicles, it will be more convenient to move the headliner module subassembly through the rear window opening. FIG. 7 shows a portion of the headliner module subassembly 70 being attached to the side roof rail 88. The attachment of the headliner module subassembly 70 can be effected by using a portion of a side roof rail air bag assembly 90, shown in phantom, and fasteners 92. Because the headliner module subassembly 70 is attached to the vehicle 80 before the roof assembly 68, the headliner module subassembly 70 can be installed by an operator standing outside the vehicle 80.

Figure 8:
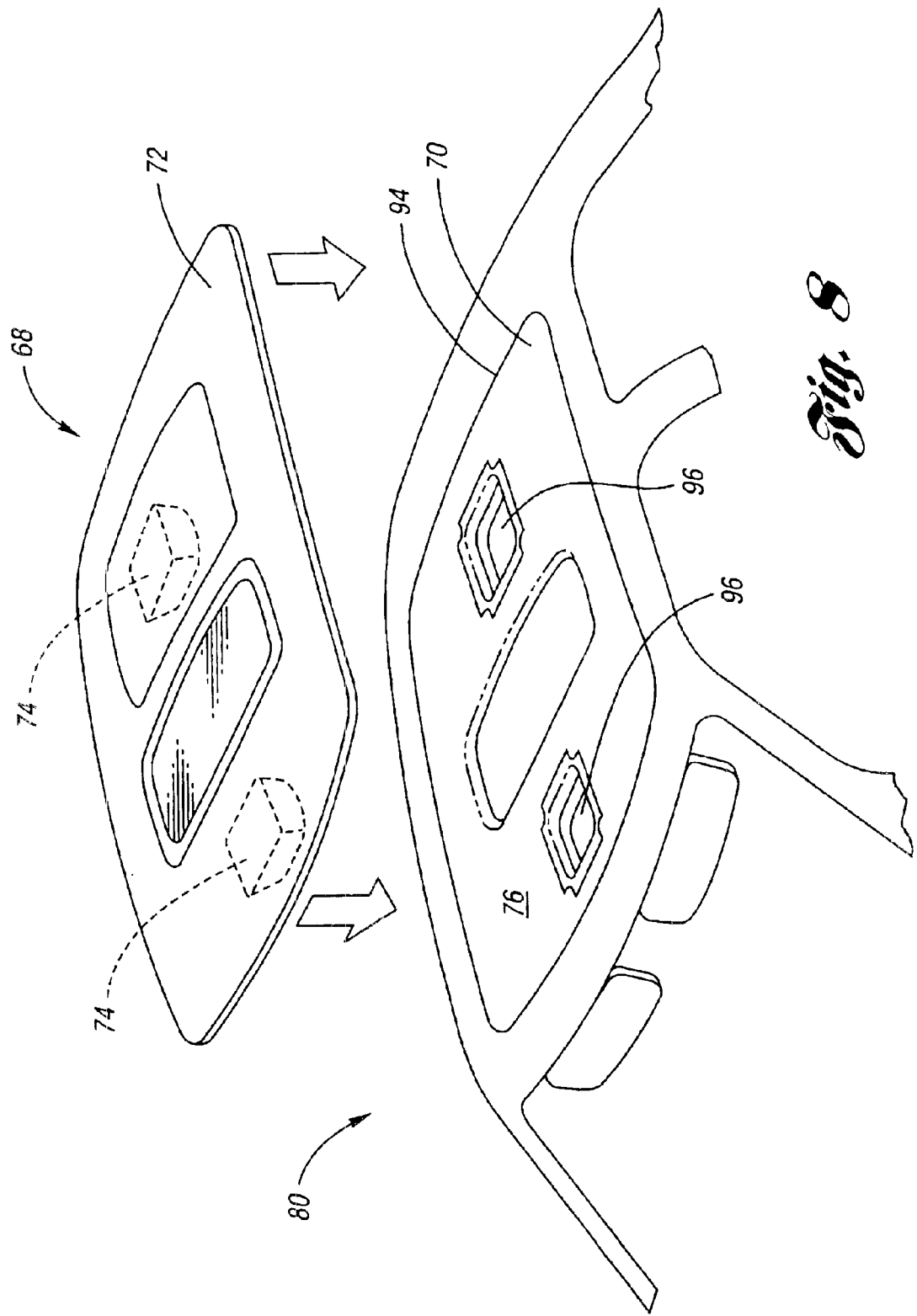
FIG. 8 is a fragmentary perspective view illustrating the attachment of a roof assembly to the vehicle.

FIG. 8 illustrates the attachment of the roof assembly 68 to the vehicle 80. A transport arm such as 40 shown in FIGS. 1 and 2 is used to position the roof assembly 68 over the roof opening 94, where it is guided into place and secured with adhesive such as 52 shown in FIG. 2. Openings 96 in the headliner module subassembly 70 are configured to accommodate the components 74 in the roof assembly 68. Flaps (not shown) may be provided on the headliner 76 around the openings 96 to surround the edges of the components 74 after installation.

Some of the benefits of the present invention are readily seen from the description above. Installation of the roof assembly into the vehicle occurs with all operators outside the vehicle. This eliminates the need for operators to work overhead with unwieldy headliner assemblies, which increases efficiency and lowers production costs. Further cost reductions are realized because several components of the roof assembly—e.g., headliner, electronic components, and roof outer panel—are loaded in one station. This reduces the total number of assembly stations required in the vehicle assembly plant. In addition, because the roof assembly process is moved to the general assembly plant, welding of metal roof panels does not occur in a body shop where space is limited. The limited space in body shops put constraints on the number of options vehicle manufacturers can offer in a vehicle platform. Taking advantage of the greater available space at a general assembly facility not only increases efficiency, but also allows vehicle manufacturers greater flexibility in the options they offer in a vehicle platform.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for assembly of a vehicle roof assembly into a vehicle, comprising:

providing a structure including two opposing side rails and two opposing headers defining a roof opening in the vehicle;

providing a headliner having first and second free edges;

providing a first inventory of components suitable for use inside the vehicle;

providing an inventory of panels suitable for closing the roof opening of the vehicle;

assembling the headliner and at lest one of the components from the first inventory of components to form a roof subassembly; and attaching the roof subassembly to the structure defining the roof opening from outside the vehicle so that the first and second free edges are located in a position corresponding to the headers and the headliner does not overlap at least a portion of the side rail.

2. The method of claim 1, wherein the at least one component from the first inventory of components is chosen from sunroof assemblies, roof antennas, infotainment systems, air ducts, switches, lights, wires and harnesses, consoles, audio components, navigation systems, display systems, compasses, thermometers, mirrors or combinations thereof.

3. The method of claim 2, further comprising assembling at least one side roof module subassembly from at least a roof rail air bag and a side trim component between the first and second free edges of said headliner.

4. The method of claim 3, further comprising attaching the at least one side roof module subassembly to the side rail of the vehicle from outside the vehicle.

5. The method of claim 3, wherein assembling the at least one side roof module subassembly further comprises assembling at least one component from a second inventory of components into the at least one side roof module subassembly.

6. The method of claim 5, wherein the at least one component from the second inventory of components is chosen from assist handles, assist straps, hooks, hangers or combinations thereof.

7. The method of claim 1, wherein the at least one component from the first inventory of components is chosen from sunroof assemblies, roof antennas, infotainment systems, consoles or combinations thereof.

8. The method of claim 1, further comprising assembling at least one component from a second inventory of components with the headliner to form a headliner side module subassembly, disposing the headliner side module subassembly within the vehicle, and attaching the headliner side module subassembly to the vehicle from outside the vehicle between the first and second free edges of the headliner.

9. The method of claim 8, wherein the at least one component from the second inventory of components is chosen from side roof rail air bags, air ducts, switches, lights, wires and harnesses, audio components, navigation systems, display systems, compasses, thermometers, mirrors or combinations thereof.

10. A method for assembly of a vehicle roof assembly into a vehicle, comprising:

providing a structure including two opposing side rails and two opposing headers defining a roof opening in the vehicle;

providing a first inventory of components suitable for use inside the vehicle;

providing an inventory of panels suitable for closing the roof opening of the vehicle;

assembling at least one of the components from the first inventory of components, a panel from the inventory of panels, and a headliner having first and second free edges to form a roof assembly;

installing the roof assembly into the vehicle by placing the headliner through the roof opening such that the first and second free edges are located in a position corresponding to the headers and the headliner does not overlap at least a portion of the side rail; and attaching the first and second edges to the vehicle, thereby concealing a portion of the structure defining the roof opening.

11. The method of claim 10, wherein the at least one component from the first inventory of components is chosen from sunroof assemblies, roof antennas, infotainment systems, air ducts, switches, lights, wires and harnesses, consoles, audio components, navigation systems, display systems, compasses, thermometers, mirrors or combinations thereof.

12. The method of claim 11, further comprising assembling at least one side roof module subassembly from at least a roof rail air bag and a side trim component.

13. The method of claim 12, further comprising attaching the at least one side roof module subassembly to the vehicle from outside the vehicle between the first and second free edges.

14. The method of claim 12, wherein assembling the at least one side roof module subassembly further comprises assembling at least one component from a second inventory of components into the at least one side roof module subassembly.

15. The method of claim 14, wherein the at least one component from the second inventory of components is chosen from assist handles, assist straps, hooks, hangers or combinations thereof.

16. A method for assembly of a vehicle roof assembly into a vehicle, comprising:
providing a structure including two opposing side rails and two opposing headers defining a roof opening in the vehicle;
providing a headliner having spaced edge portions free of said side rail;
providing a first inventory of components suitable for use inside the vehicle;
providing an inventory of panels suitable for closing the roof opening of the vehicle;
choosing at least one component from the first inventory of components;
choosing a panel from the inventory of panels as a roof outer panel;
attaching the headliner and at least one component chosen from the first inventory of components to the roof outer panel chosen from the inventory of panels to form a roof assembly; and
attaching the roof assembly to the structure defining the roof opening from outside the vehicle wherein the spaced edge portions of the headliner are located in a position corresponding to the headers and the headliner does not overlap said side rail.

17. The method of claim 16, wherein the at least one component from the first inventory of components is chosen from sunroof assemblies, roof antennas, infotainment systems, consoles or combinations thereof.

18. The method of claim 17, further comprising assembling at least one component from a second inventory of components with the headliner to form a headliner module subassembly, disposing the headliner module subassembly within the vehicle, and attaching the headliner module subassembly to the vehicle from outside the vehicle.

19. The method of claim 18, wherein the at least one component from the second inventory of components is chosen from side roof rail air bags, air ducts, switches, lights wires and harnesses, audio components, navigation systems, display systems, compasses, thermometers, mirrors or combinations thereof.

* * * * *